United States Patent [19]

Sensing et al.

[11] Patent Number: 4,569,149

[45] Date of Patent: Feb. 11, 1986

[54] DISPOSABLE MOUSE TRAP

[75] Inventors: Wylie W. Sensing, Hickman County; Ray V. Watkins, Smith County, both of Tenn.

[73] Assignee: Sureway Products, Inc., Smith County, Tenn.

[21] Appl. No.: 598,234

[22] Filed: Apr. 9, 1984

[51] Int. Cl.⁴ ............................................. A01M 23/00
[52] U.S. Cl. ............................................ 43/61; 43/58
[58] Field of Search ................. 43/58, 61, 77, 88, 114

[56] References Cited

U.S. PATENT DOCUMENTS

| | | | |
|---|---|---|---|
| 1,071,678 | 8/1913 | Maxwell | 43/61 |
| 1,077,064 | 10/1913 | Hamann | 43/61 |
| 1,590,879 | 6/1926 | Boynton | 43/61 |
| 1,614,896 | 1/1927 | Peck | 43/61 |
| 1,650,455 | 11/1927 | Lewis | 43/61 |
| 1,913,823 | 6/1933 | Witte | 43/61 |
| 2,243,367 | 5/1941 | Abriol | 43/61 |
| 2,518,819 | 8/1950 | Roessler | 43/61 |
| 4,158,929 | 6/1979 | Custard | 43/61 |
| 4,244,134 | 1/1981 | Otterson | 43/114 |
| 4,366,642 | 1/1983 | Gardener et al. | 43/88 X |
| 4,483,093 | 11/1984 | Isborn | 43/58 |

FOREIGN PATENT DOCUMENTS 126038  2/1901  Fed. Rep. of Germany .......... 43/61

Primary Examiner—Kuang Y. Lin
Assistant Examiner—M. Jordan
Attorney, Agent, or Firm—Pitts and Brittian

[57] ABSTRACT

A disposable mouse trap (10) for capturing and killing mice or other small animals. The trap (10) comprises an elongated four-sided prism-shaped enclosure (12) provided with an entry end (22) for providing access to the enclosure (12) and an end wall (24) sealing the further end of the enclosure (12). The trap (10) further comprises a trap member (28) hingedly engaged to a corresponding wall of the prism-shaped enclosure (12) such that the trap member (28) will swing toward the end wall (24) of the enclosure (12) to a set position and will swing away from such corresponding wall of the enclosure (12) to a triggered position wherein the trap member (28) is substantially perpendicular to the side walls of the prism-shaped enclosure (12). A biasing means is providing for urging the trap member (28) toward the triggered position along with a trigger member (26) for restraining the trap member in a set position against the force of the biasing means. In one embodiment, the trap (10) is provided with a bait enclosure (60) limiting access to the bait within the trap (10).

9 Claims, 6 Drawing Figures

DISPOSABLE MOUSE TRAP

DESCRIPTION

1. Technical Field

This invention relates generally to mouse and small animal traps, and more particularly to a disposable mouse trap which is extremely inexpensive to manufacture and which takes some of the unpleasantness out of disposing of the dead mouse by maintaining the mouse completely hidden from view within the disposable combination container and trap of this invention.

2. Background Art

The control of rodents, such as mice and rats, has been an ongoing problem over the centuries. As is well known, many types of controls have been tried and used, including poisons, traps that take the animals alive, traps that kill the animals by various techniques, etc. Of course, in the home, it is usually not desirable to use a trap which leaves the animals alive so that they must be disposed of since the live rodent may find its way back to its home. Also, as will be appreciated by anyone familiar with mice and the control of mice, mice may show up in any type of home no matter what the economic level or the care taken in keeping the premises clean. Consequently, at some time, every home may be required to engage efforts to eliminate or control mice or rodents. To this end, control of mice or rodents in the private home has been accomplished, as was mentioned above, by poisons which are taken back to the nest, or traps which usually kill the animal immediately. Unfortunately, the use of poisons sometimes has a disagreeable side effect in that the mouse will take the poison back to its nest then die along with other mice or rodents in the nest. Unfortunately, the nest is usually in a location which is inaccessible such that the death of the mice often results in a disagreeable odor which cannot be reached. On the other hand, the traps that commonly kill the mouse are usually boards with spring loaded wire members which snap around and break the mouse's neck or choke it to death. Thus, when the dead mouse is found in the trap, there is always the unpleasant task of disposal which may include blood and other disagreeable reminders of the violent death the mouse has encountered. Thus, disposing of the dead mouse often results in an almost unbearable task for the squeamish homeowner or other person to whom the task may fall. Further, even though it may be possible to simply throw away the standard mouse trap, the dead mouse and all of the reminders of its violent death are still readily visible, since the trap must still be picked up and disposed of.

Of course, numerous small animal traps are disclosed in the prior art, one such trap being disclosed by United Kingdom Patent Specification No. 649,807 issued to Samuel Watt Jan. 31, 1951. The Watt device features a box like structure provided with a trigger element and an animal engaging element, the animal engaging element being spring biased to capture or kill a small animal which trips the trigger element while attempting to gain access to the bait within the trap. However, the Watt trap is a complex device having various pivoting parts and would be costly to manufacture and, thus, would not be suitable for use as a disposable trap. This being the case, repeated use of the trap is called for and the user must perform the unpleasant task of removing the dead animal from the trap and cleaning or otherwise preparing the trap for subsequent use. Further, in the Watt device, the bait is not held by the trigger element and thus the animal is not being baited to a particular location within the trap for efficiently killing the animal. As a result, the animal is often caught but not killed, leaving the user the unpleasant task of killing and removing the animal. Also, whether or not the animal is captured or killed, the animal remains within the sight of the user which may be disturbing to the squeamish. The same is true for the trap disclosed in U.S. Pat. No. 4,366,642 issued to Gardner, et al., on Jan. 4, 1983.

A further trap is disclosed by U.S. Pat. No. 1,866,776 issued to E. C. Sloulin on July 12, 1932. However, the Sloulin trap does not provide for the killing of the animal and leaves this task to the user. Further, whereas the design of the Sloulin trap is suitable for fabrication out of metal, the design would not permit the use of a less expensive material such as cardboard, and thus it is contemplated that the trap will be reusable rather than disposable. It will also be noted that a trap similiar to that of Sloulin is disclosed by U.S. Pat. No. 1,861,478 issued on June 7, 1932 to J. Kleffman. However, the Kleffman device is also a capture trap which does not provide for the killing of the captured animal and its construction also dictates the use of a strong durable fabricating material such as metal. A small animal trap is also disclosed by U.S. Pat. No. 2,518,819 issued to A. B. Roessler, Jr., on Aug. 15, 1950. Although the Roessler trap can be fabricated of cardboard, it will be noted that the device merely entraps the animal such that it can be poisoned.

Therefore, it is an object of the present invention to provide a simple and inexpensive disposable mouse trap.

It is still another object of the this invention to provide a disposable mouse trap whereby the dead animal remains hidden from view inside the trap such that the complete trap and mouse may be disposed of with minimum unpleasantness.

It is yet another object of the present invention to provide a disposable mouse trap which is inexpensive to manufacture and effective in its ability to trap and kill mice.

DISCLOSURE OF THE INVENTION

Other objects and advantages will be accomplished by the present invention which provides a disposable mouse trap for capturing and killing mice and other small animals. The trap comprises an elongated four-sided prism-shaped enclosure provided with an entry end for providing access to the enclosure and an end wall sealing the further end of the enclosure. The trap further comprises a trap member hingedly engaged to a corresponding wall of the prism-shaped enclosure such that the trap member will swing toward the end wall of the enclosure to a set position and will swing away from the corresponding wall of the enclosure to a triggered position wherein the trap member is substantially perpendicular to the four side walls of the prism-shaped enclosure. A biasing means is provided for urging the hinged trap member toward the triggered position along with trigger means for restraining the trap member in the set position against the force of the biasing means, the trigger means further operates to release the trap member when the trigger means is moved, such that the trap member moves to the triggered position to capture and kill a mouse or small animal. In one embodiment, the trap is provided with a bait enclosure limiting access to the bait within the trap such that the mouse or small animal is in the desired position for being captured and killed by the trap member.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

Figure 1:
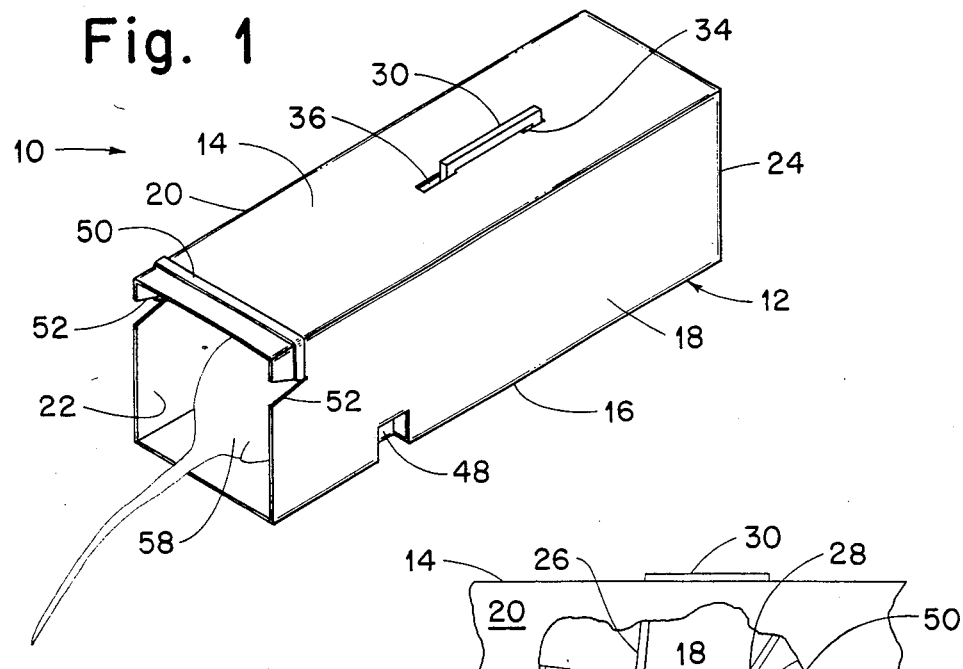
FIG. 1 illustrates a perspective view of the disposable mouse trap of the present invention.
Figure 2:
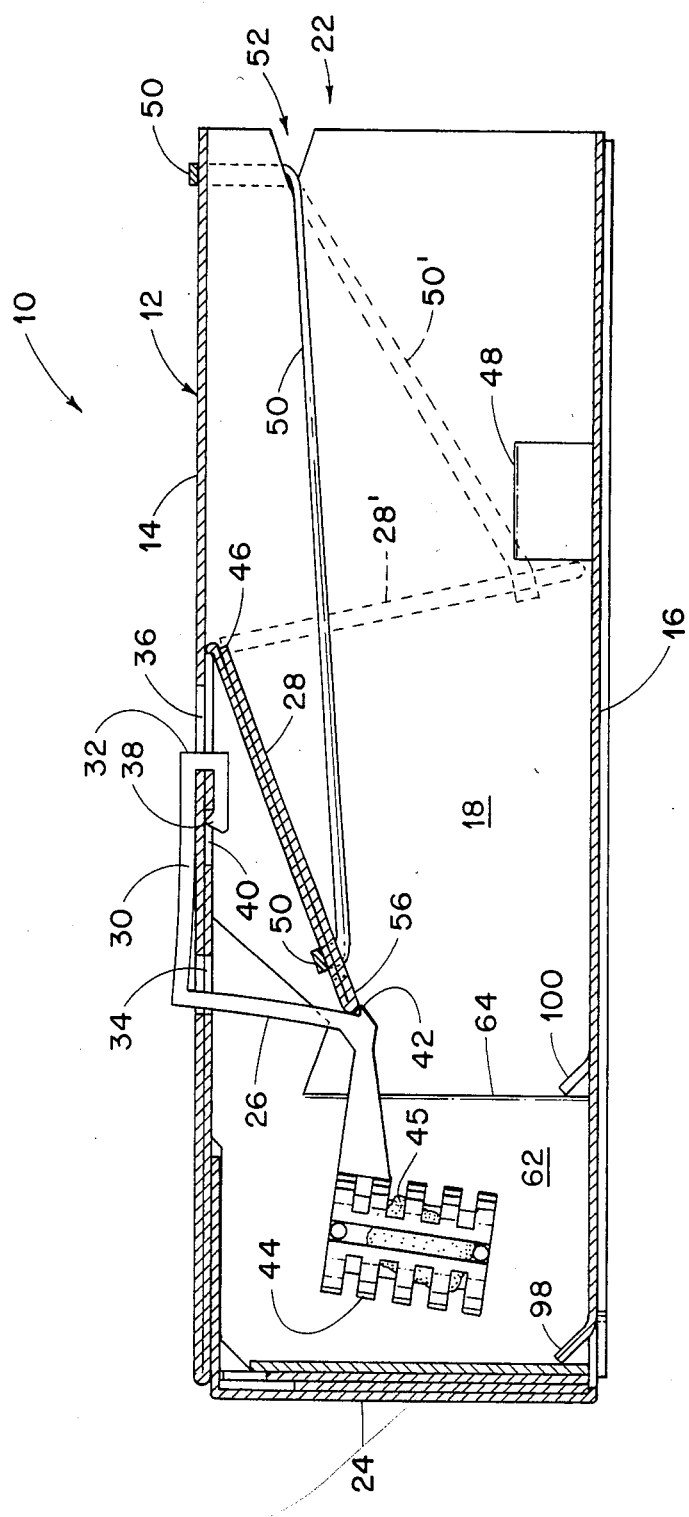
FIG. 2 illustrates a side elevation view, in section, of the disposable mouse trap of the present invention.

A disposable mouse trap incorporating various features of the present invention is illustrated generally at 10 of FIG. 1. The mouse trap 10 comprises an elongated prism-shaped enclosure 12 defined by upper and lower walls 14 and 16, respectively, and opposite side walls 18 and 20. Further, the trap is provided with an entry end 22 and a further enclosure end wall 24. As illustrated in FIG. 2, the end wall 24 closes off the disposable trap 10 with the only access to the trap being through the entry end 22.

As is further illustrated by FIG. 2, the upper wall 14 supports a trigger member 26 and a hinged trap member 28. More specifically, the trigger member 26 is provided with a support stem 30 terminating in a fastener clip 32. The trigger member 26 is mounted by inserting the support stem 30 through a first aperture 34 in the upper wall 14 and inserting the fastener clip 32 in a second aperture 36 in the upper wall 14 and pulling the trigger member 26 in the direction of the end wall 24 until the clip retainer nub 38 is seated in the recess 40 of the upper wall 14. The trigger member 26 further comprises a catch member 42, the operation of which will be discussed below, and a cage-like bait container 44 for securing the bait 45 within the trap 10. It will be noted that the bait container 44 allows the mouse to see and smell the bait 45, but does not allow the mouse access to the bait 45. Thus, the mouse cannot remove the bait 45 from the trap 10 and the flustration of being unable to remove the bait 45 generally results in increasingly more aggressive attempts by the mouse to secure the bait 45 ensuring that the mouse will eventually trigger the trap 10. The bait container 44 also allows the trap to be prebaited, as with a food pellet, upon manufacture such that an ultimate user is not required to bait the trap.

Figure 3:
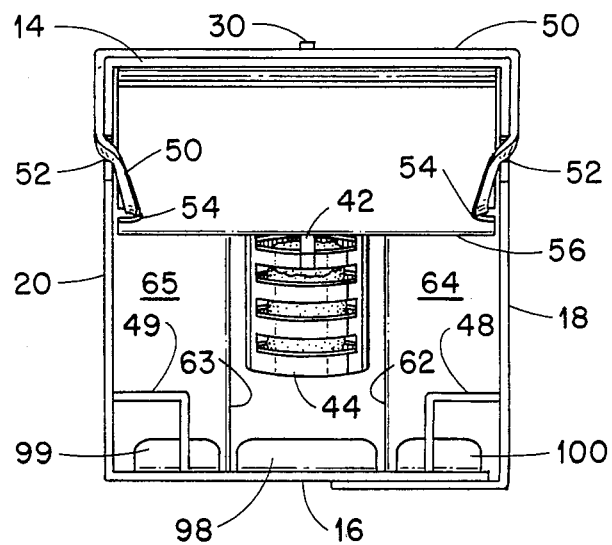
FIG. 3 illustrates an end view of the disposable mouse trap of the present invention.

The trap member 28 is hinged to the upper wall 14 at its first end portion 46 such that it is capable of pivoting between the cocked or set position illustrated by solid lines in FIG. 2 to the uncocked or triggered position illustrated by broken lines at 28' of FIG. 2, the forward pivoting of the trap member being terminated by a pair of stop members 48 and 49 (see FIG. 3). A rubber band 50 is provided for biasing the trap member 28 to a triggered position. In this regard, each of the side walls 18 and 20 is provided with a notch 52 to facilitate releasably securing the rubber band 50 to the enclosure 12, the rubber band 50 being looped over the exterior of upper wall 14 and received in the notches 52 and thus routed to the interior of the enclosure 12. Further, the trap member 28 is provided with a pair of oppositely disposed notches 54 whereby the rubber band 50 is looped around the trap member 28 and held in place so as to bias the trap member to a triggered position. Thus, it will be appreciated that to set the trap 10, the trap member 28 is merely pivoted such that its outboard edge 58 engages the trigger member 26 to be releasably held in a set position by the catch member 42.

Figure 4:
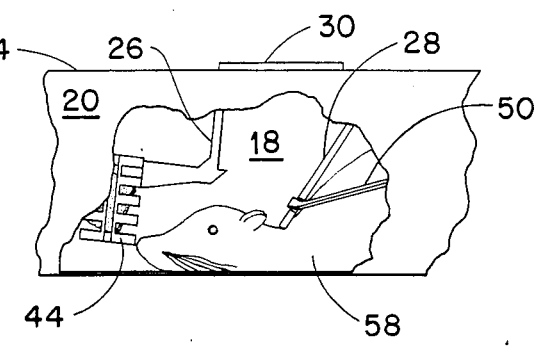
FIG. 4 illustrates a partial side view, partially in section, of the disposable mouse trap of the present invention.

Preferably, the trigger member 26 is fabricated of a flexible material such as plastic or wire such that a very slight movement of the bait container 44 releases the trap 28 from the catch member 42. Thus, as illustrated in FIG. 4, when the bait container 44 is nudged or moved by the mouse 58 in an attempt to access the bait 45, the trap member 28 is released and quickly snaps down on the mouse 58 striking it proximate the neck and choking or suffocating the mouse 58 until it is dead.

Figure 6:
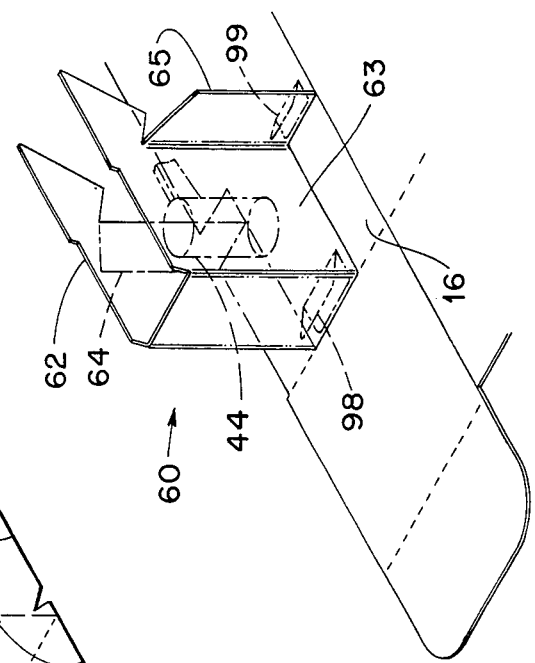
FIG. 6 is a perspective view of the bait enclosure of the disposable mouse trap of the present invention.

As is best illustrated in FIG. 6, a preferred embodiment of the trap 10 is provided with an interior bait enclosure 60 defined by opposite enclosure walls 62 and 63, and perpendicular support walls 64 and 65. The enclosure 60 serves to further limit the mouse's access to the bait 45. It will be appreciated that given the enclosure 60, the mouse 58 must approach the bait 45 from in front of the bait container 44 so as to place the mouse 58 beneath the trap member 28 in the ideal position to be caught by the decending trap member 28. This not only increases the likelihood of capture, but increases the likelihood of death upon capture.

Figure 5:
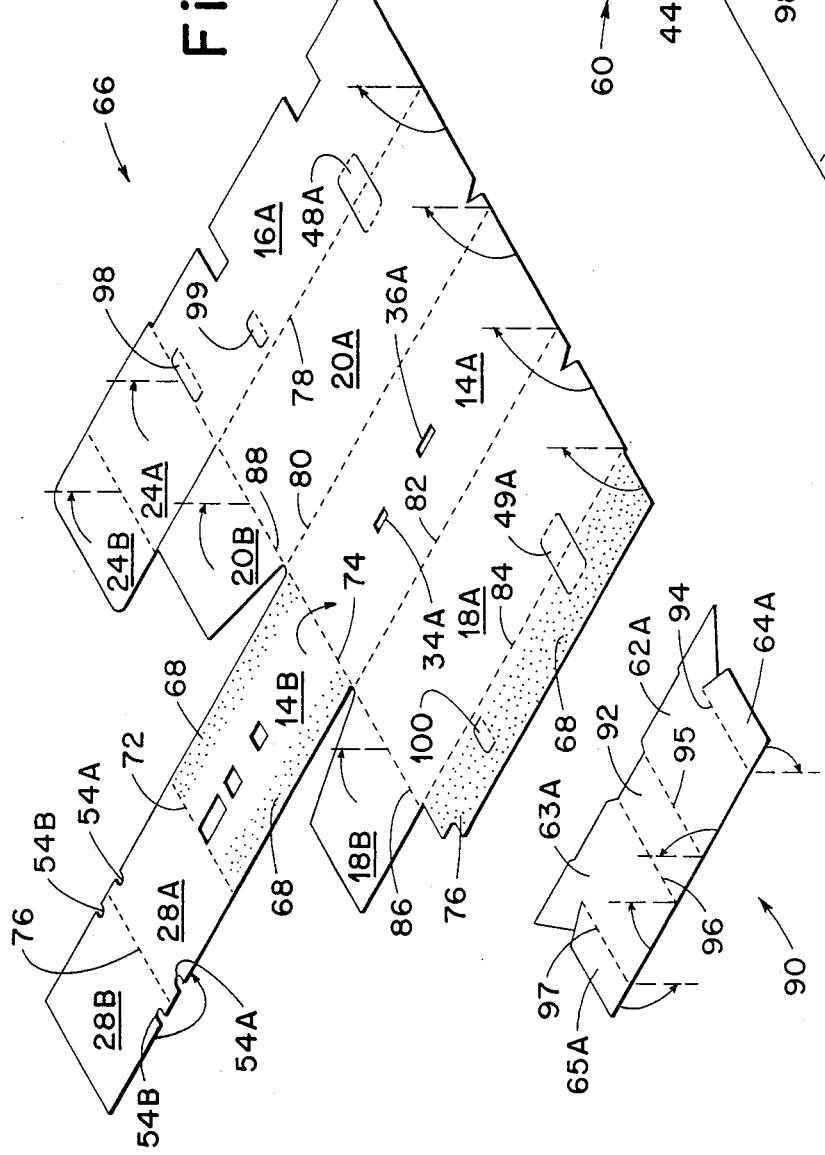
FIG. 5 illustrates a perspective view of the fabricating sheets of the disposable mouse trap of the present invention.

Referring now to FIG. 5, in a preferred embodiment of the trap 10, the enclosure 12 is integrally formed from a single fabricating sheet 66 comprising fabricating material such as cardboard or plastic. However, it will be appreciated that various other fabricating materials can be used if desired, cardboard or plastic being merely an effective and inexpensive fabricating material. With regard to the manner of assembling the enclosure 12, the arrows depicted in FIG. 5 represent the direction in which a fold is made with crease or fold lines being indicated by broken lines. Thus, it will be noted that the sheet 66 comprising a side panel 14A and an overlapping re-enforcement panel 14B, the panel 14B being provided with a suitable adhesive as illustrated at 68. The panel 14B is folded at crease line 70 so as to engage and overlap panel 14A, the panels 14A and 14B being secured together by the adhesive 68. It will be appreciated that the panels 14A and 14B combine to define the upper wall 14, with the apertures 34A and 36A of panel 14A and the apertures 34B and 36B of panel 14B, respectively, registering to define the apertures 34 and 36 of upper wall 14 as illustrated in FIG. 2. Further, the aperture 40A of panel 14B defines the recess 40 of the upper wall 14.

The trap member 28 is formed by folding adjacent panels 28A and 28B of sheet 66 at crease line 72 as illustrated, and securing the panels 28A and 28B together with a suitable adhesive (not shown). The notches 54A of panel 28A and the notches 54B of panel 28B thus register to define the notches 54 of FIG. 3 for securing the rubber band 50. With the panels 28A and 28B secured together, the crease line 74 serves as the pivot point for the trap member 28.

The sheet 66 further comprises panels 16A, 18A, and 20A, corresponding to lower wall 16, and side walls 18 and 20, respectively, and further comprises lip portion 76. Crease lines 78, 80, 82, and 84 are provided such that the panels 16A, 20A, 14A, and 18A can be readily folded to form the prism-shaped enclosure 12, with the lip member 76, provided with adhesive 68, serving to engage the panel 16A to secure the panels in a prism-shaped configuration. The end wall 24 is then formed by folding the flaps 18B and 20B at crease lines 86 and 88, respectively, and folding the panel 24A at crease line 90 and the flap 24B at crease line 92, such that panel 24A, and flaps 28B and 20B, combine to define the end wall 24 with the flap 24B inserted into the enclosure 12 adjacent upper wall 14. Also, it will be appreciated that the stop members 48 and 49 are formed by folding cut-out portions 48A and 49A inwardly with respect to the enclosure 12 to the configuration illustrated at 48 in FIG. 3.

Also illustrated in FIG. 5, the bait enclosure 60 can be fabricated of a single fabricating sheet 90. The sheet 90 comprises panels 62A, 63A, 64A, and 65A, corresponding to opposite enclosure walls 62 and 63, and support walls 64 and 65, respectively, as illustrated in FIGS. 2 and 3, and further comprises an end panel 92.

Referring now to FIGS. 5 and 6, it will be noted that the sheet 90 is folded at crease lines 94, 95, 96 and 97 as illustrated to form the bait enclosure 60. It will also be noted that panel 16A is provided with foldout retainer members 98 and 99, and lip portion 76 is provided with foldout retainer member 100. The retainer member 98 serves to hold the end panel 92 in position within the enclosure 12 and the retainer members 99 and 100 serve to hold the panels 65A and 64A, respectively, in position within the enclosure 12.

Thus, it will be appreciated that the ability to construct the enclosures 12 and 60 from unitary fabricating sheets composed of an inexpensive material, make the trap 10 inexpensive to manufacture and thus holds down the sales price such that the trap 10 is economically practical as a disposable trap. Therefore, the user can merely throw away the trap when a mouse has been caught and there is no need to perform the unpleasant task of removing the mouse from the trap, or to even see the captured animal contained within the trap 10. Further, the ability to assemble the enclosures 12 and 60 from single fabricating sheets having preselected peripheries allows the trap 10 to be marketed in a disassemblied condition to be easily assemblied by the user, thus reducing storage and shipping costs and resultantly sales price.

While a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. A disposable mouse trap for capturing and killing mice or other small animals, said trap comprising:

an elongated prism-shaped enclosure having a selected cross-section, said enclosure comprising an upper wall and a lower wall and opposite side walls, and having an entry end and a further end, said enclosure including an end wall joined to and sealing said further end, said upper wall being provided with first and second apertures and an interior surface defining a recess located proximate said second aperture;

a rigid rectangular trap member, said trap member having a perimeter substantially corresponding to said selected cross-section, said trap member including a hinged edge portion and an opposite edge portion, said hinged edge portion hingedly engaging said upper wall of said enclosure such that said opposite edge portion of said trap member can be rotated toward said end wall to a set position wherein said opposite edge portion extends down and away from said upper wall, and wherein said trap member will swing down and away from said set position to a triggered position substantially perpendicular to each of said side walls of said enclosure;

a biasing means for providing force to urge said hinged trap member towards said triggered position; and trigger means for releasably restraining said trap member in said set position against the force of said biasing means and for releasing said restrained trap member to said triggered position when said trigger means is moved, said trigger means comprising a trigger member moving a support stem with an inboard and an outboard portion, said inboard portion being received through said first aperture in said upper wall of said enclosure to project into said enclosure, said outboard portion defining a fastener clip having a retainer nub, said fastener clip being received in said second aperture in said upper wall with said retainer nub being received in said recess so as to lock said trigger member in place, said support stem carrying bait securing means at said inboard portion, and being provided with a catch member proximate said bait securing means to releasably engage said opposite edge portion of said trap member in said set position.

2. The disposable mouse trap of claim 1 wherein said trap member further comprises a bait enclosure within said prism-shaped enclosure, said bait enclosure comprising a pair of bait enclosure walls oppositely disposed on either side of said means for securing bait, said bait enclosure defining an access opening of preselected size facing said entry end of said prism-shaped enclosure for allowing limited access to said means for securing bait within said trap.

3. The disposable mouse trap of claim 1 wherein said means for securing bait within said trap comprises a bait container for containing bait whereby said mouse or other small animal is able to see and smell but not remove said bait from said trap.

4. The disposable mouse trap of claim 1 wherein said prism-shaped enclosure is provided with at least one stop member mounted within said enclosure for prohibiting said trap member from swinging through said triggered position.

5. The disposable mouse trap of claim 1 wherein said biasing means comprises a rubber band connected between said entry end of said enclosure and said trap member.

6. The disposable mouse trap of claim 1 wherein each said side wall of said prism-shaped enclosure is provided with a notch at said entry end of said enclosure proximate said upper wall for releasably receiving and securing said rubber band, and said trap member is provided with a pair of oppositely disposed notches proximate said opposite edge portion for receiving and securing said rubber band.

7. The disposable mouse trap of claim 2 wherein each said bait enclosure wall is provided with a cooperating support wall engaged to and extending substantially perpendicular from said bait enclosure wall for supporting said bait enclosure walls in position within said prism-shaped enclosure.

8. The disposable mouse trap of claim 1 wherein said fabricating sheet is made from materials selected from the group consisting of cardboard and plastic.

9. A disposable mouse trap for capturing and killing mice and other small animals, said trap comprising:

an elongated prism-shaped enclosure having a selected cross-section, said enclosure comprising an upper wall and a lower wall and opposite side walls, and having an entry end and a further end, said enclosure including an end wall joined to and sealing said further end, said upper wall of said enclosure being provided with first and second apertures, and an interior surface defining a recess, said recess being located proximate said second aperture, said enclosure further comprising at least one stop member mounted within said enclosure, each said side wall of said enclosure being provided with a notch proximate said entry end of said enclosure proximate said upper wall;

a rigid four-sided trap member, said trap member having a perimeter substantially corresponding to said selected cross-section, said trap member comprising a hinged edge portion and an opposite edge portion, said hinged edge portion hingedly engaging said upper wall of said enclosure such that said opposite edge portion of said trap member may be rotated towards said end wall to a set position, wherein said opposite edge portion extends down and away from said upper wall, and wherein said trap member will swing down and away from said set position to a triggered position, substantially perpendicular to each of the four sides of said enclosure, the travel of said trap member being terminated by said stop member said trap member being further provided with a pair of oppositely disposed notches proximate said opposite edge portion;

biasing means for providing forced to urge said hinged trap member toward said triggered position, said biasing means comprising a rubber band received within said notches in said side walls of said enclosure so as to be secured proximate said entry end of said enclosure, and received in said oppositely disposed notches of said trap member, such that said rubber band is connected between said entry end of said prism and said trap member;

trigger means for restraining said trap member in said set position against the force of said biasing means, said trigger means further operating to release said restrained trap member when said trigger means is moved such that said trap member moves to said triggered position, said trigger means comprising a trigger member provided with means for mounting said trigger member to said upper wall of said enclosure and further provided with means for securing bait within said trap, said trigger member being further provided with a catch member for releasably engaging said opposite edge portions of said trap member so as to selectively restrain said trap member in said set position against the force of said biasing means, said means for mounting said trigger member to said upper wall comprising a support stem for engaging said upper wall of said enclosure, said support stem having an outboard end portion defining a fastener clip provided with a clip retainer nub, said support stem being received through said first aperture in said upper wall and said fastener clip being received in said second aperture so as to engage said upper wall with said clip retainer nub being received in said recess in said interior surface of said upper wall so as to lock said trigger member in place, said means for securing bait within said trap comprising a bait container for containing bait whereby said mouse or other small animal is able to see and smell, but not remove, said bait from said trap; and a bait enclosure housed within said prism-shaped enclosure, said bait enclosure comprising a pair of enclosure walls oppositely disposed on either side of said bait container, said bait enclosure defining an access opening of preselected size facing said entry end of said prism-shaped enclosure so as to allow limited access to said bait container, each said bait enclosure wall being provided with a support wall engaged to and extending substantially perpendicular from said bait enclosure wall for supporting said bait enclosure walls in position on either side of said bait container.

* * * * *